(12) United States Patent
Shen

(10) Patent No.: US 7,520,627 B1
(45) Date of Patent: Apr. 21, 2009

(54) BACKLIGHT MODULE

(76) Inventor: Yu-Nung Shen, No. 60, Lane 328, Li-Shan St., Nei-Hu Dist., Taipei (TW)

( * ) Notice: Subject to any disclaimer, the term of this patent is extended or adjusted under 35 U.S.C. 154(b) by 0 days.

(21) Appl. No.: 11/939,094

(22) Filed: Nov. 13, 2007

(51) Int. Cl.
*F21V 9/16* (2006.01)

(52) U.S. Cl. .......................... 362/84; 362/29; 362/217; 362/330; 362/615

(58) Field of Classification Search ................... 362/84, 362/558, 217, 223, 224, 227, 235, 237, 28, 362/30, 97, 330, 615, 617, 619, 623, 625, 362/626; 349/58–62
See application file for complete search history.

(56) References Cited

U.S. PATENT DOCUMENTS

| | | | | |
|---|---|---|---|---|
| 6,933,669 B2 * | 8/2005 | Jean et al. | ................... | 313/491 |
| 2004/0075387 A1 * | 4/2004 | Moore | ......................... | 313/582 |
| 2004/0130911 A1 * | 7/2004 | Chen | ........................... | 362/558 |
| 2004/0207995 A1 * | 10/2004 | Park et al. | ...................... | 362/31 |
| 2006/0017863 A1 * | 1/2006 | Kim | ............................ | 349/62 |
| 2007/0269653 A1 * | 11/2007 | Kanamori et al. | ........... | 428/336 |

\* cited by examiner

*Primary Examiner*—Sandra L. O'Shea
*Assistant Examiner*—Gunyoung T. Lee
(74) *Attorney, Agent, or Firm*—Hunton & Williams LLP

(57) ABSTRACT

A backlight module includes: a transparent panel having a grooved surface and a planar surface opposite to the grooved surface, the transparent panel being formed with a plurality of elongate grooves that are indented from the grooved surface and that are aligned in a first lateral direction, each of the elongate grooves extending in a second lateral direction transverse to the first lateral direction, and having an open end; a board attached to the grooved surface of the transparent panel to cover the open ends of the elongate grooves; a reflecting material provided on one of the planar surface of the transparent panel and the board; and a plurality of light emitting sources disposed respectively in the elongate grooves for radiating light.

7 Claims, 3 Drawing Sheets

BACKLIGHT MODULE

BACKGROUND OF THE INVENTION

1. Field of the Invention

This invention relates to a backlight module, more particularly to a backlight module including a transparent panel formed with a plurality of grooves for receiving fluorescent lamps therein.

2. Description of the Related Art

A backlight module is a key component of a liquid crystal display, and serves to provide a uniform light source for enabling the display of an image on a liquid crystal panel. Since the trend of the liquid crystal display has been focused on having a thin profile, there is a need on how to reduce the profile of the backlight module to thereby reduce the profile of the liquid crystal display.

SUMMARY OF THE INVENTION

The object of the present invention is to provide a backlight module that can have a reduced profile as compared to those of the conventional backlight modules.

According to this invention, there is provided a backlight module that comprises: a transparent panel having a grooved surface and a planar surface opposite to the grooved surface, the transparent panel being formed with a plurality of elongate grooves that are indented from the grooved surface and that are aligned in a first lateral direction, each of the elongate grooves extending in a second lateral direction transverse to the first lateral direction, and having an open end; a board attached to the grooved surface of the transparent panel to cover the open ends of the elongate grooves; a reflecting material provided on one of the planar surface of the transparent panel and the board; and a plurality of light emitting sources disposed respectively in the elongate grooves for radiating light.

BRIEF DESCRIPTION OF THE DRAWING

Other features and advantages of the present invention will become apparent in the following detailed description of the preferred embodiments of this invention, with reference to the accompanying drawing, in which.

DETAILED DESCRIPTION OF THE PREFERRED EMBODIMENTS

Figure 1:
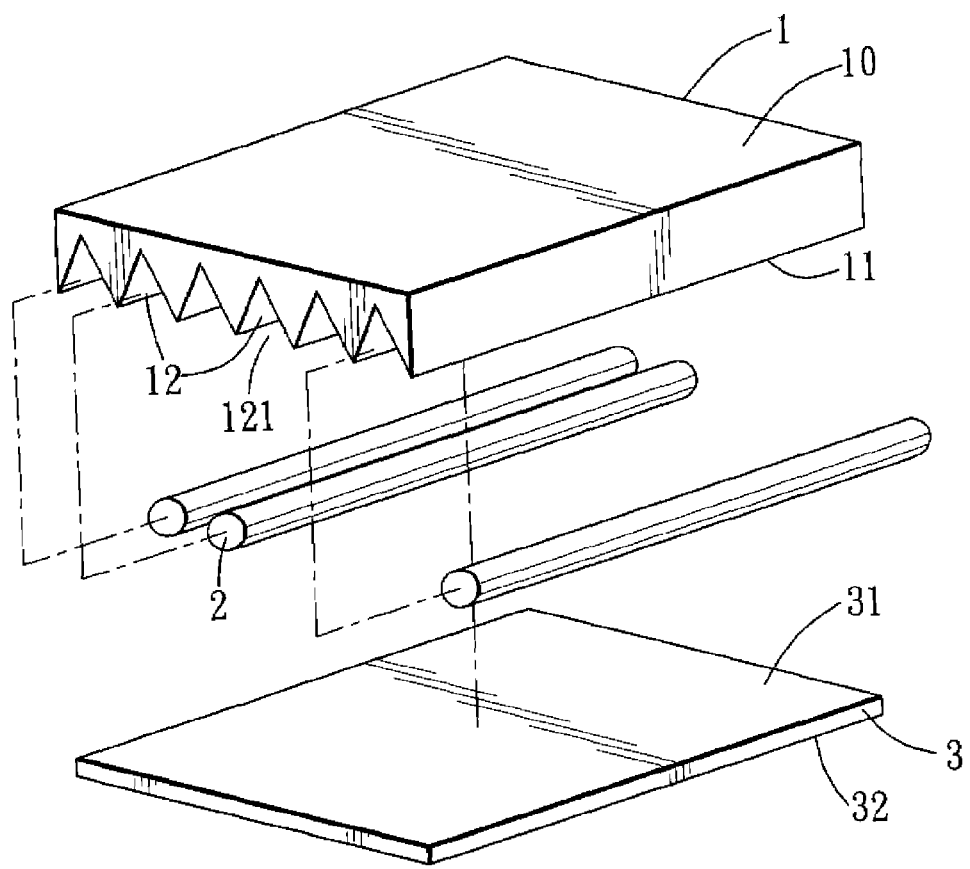
FIG. 1 is an exploded perspective view of the first preferred embodiment of a backlight module according to this invention.

Before the present invention is described in greater detail with reference to the accompanying preferred embodiments, it should be noted herein that like elements are denoted by the same reference numerals throughout the disclosure.

Figure 2:
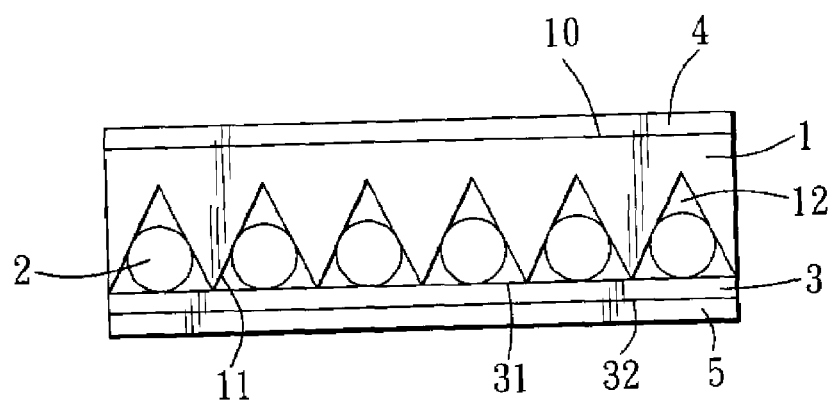
FIG. 2 is a schematic view of the first preferred embodiment.

FIGS. 1 and 2 illustrate the first preferred embodiment of a backlight module according to this invention. The backlight module includes: a transparent panel 1 having a grooved surface 11 and a planar surface 10 opposite to the grooved surface 11, the transparent panel 1 being formed with a plurality of elongate grooves 12 that are indented from the grooved surface 11 and that are aligned in a first lateral direction, each of the elongate grooves 12 extending in a second lateral direction transverse to the first lateral direction, and having an open end 121 opposite to the planar surface 10; a board 3 having opposite first and second surfaces 31, 32 and attached to the grooved surface 12 of the transparent panel 1 to cover the open ends 121 of the elongate grooves 12; a reflecting material 5 provided on one of the planar surface 10 of the transparent panel 1 and the board 3; a fluorescent layer 4 provided on the other of the planar surface 10 of the transparent panel 1 and the board 3; and a plurality of light emitting sources 2 disposed respectively in the elongate grooves 12 for radiating light. The board 3 is preferably transparent.

In this embodiment, the first surface 31 of the board 3 covers the open ends 121 of the elongate grooves 12. The reflecting material 5 is formed on the second surface 32 of the board 3. The fluorescent layer 4 is formed on the planar surface 10 of the transparent panel 1. As such, during operation, a portion of the light emitted from the light emitting sources 2 directly pass through the transparent panel 1 and the fluorescent layer 4, and the remainder of the light is reflected by the reflecting material 5 before passing through the transparent panel 1 and the fluorescent layer 4.

Figure 4:
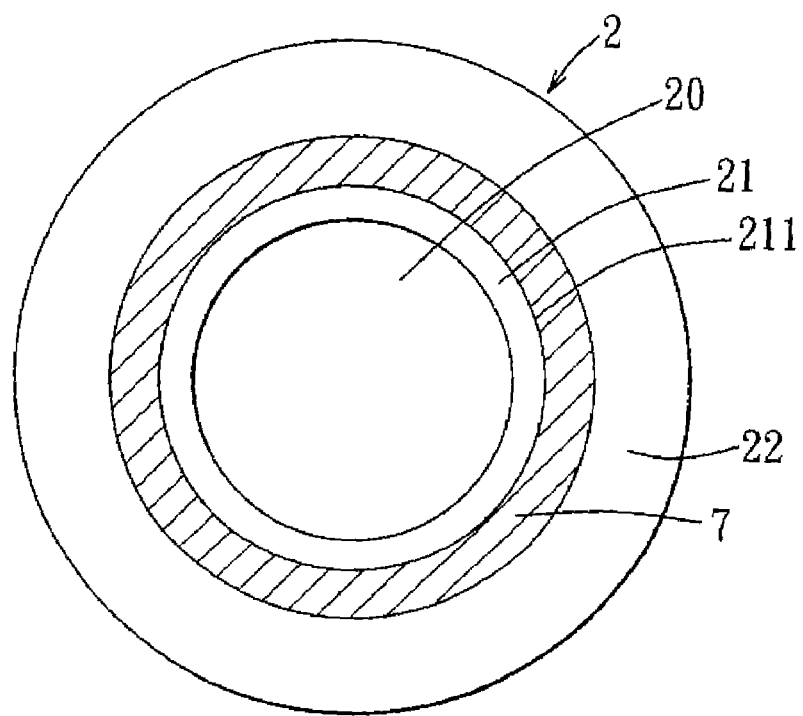
FIG. 4 is a schematic partly sectional view of a light emitting source of the first preferred embodiment.

Preferably, each of the light emitting sources 2 is in the form of a tubular lamp, such as a conventional fluorescent lamp which normally contains a fluorescent material in a lamp tube or a carbon tube lamp. Since the transparent panel 1 is provided with the fluorescent layer 4 thereon, each of the light emitting sources 2 can be made from a lamp that is dispensed with the fluorescent material. As a consequence, the diameter of the tubular lamp can be reduced. More preferably, as shown in FIG. 4, the fluorescent lamp of each of the light emitting sources 2 includes an inner tube 21 defining an enclosed inner space 20 and having an outer surface 211, a plasma forming gas received in the enclosed inner space 20, a phosphor coating 7 formed on the outer surface 211 of the inner tube 21, and an outer tube 22 enclosing an assembly of the phosphor coating 7 and the inner tube 21.

Figure 3:
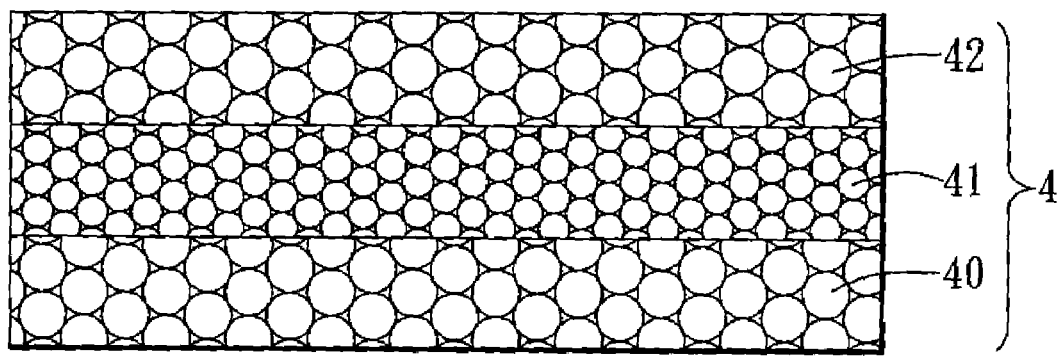
FIG. 3 is a sectional view illustrating a configuration of a fluorescent layer of the first preferred embodiment.

Preferably, as shown in FIG. 3, the fluorescent layer 4 includes a $TiO_2$ sub-layer 40, a PbS sub-layer 41, and a phosphor sub-layer 42. Alternatively, the fluorescent layer 4 can include a blue phosphor sub-layer, a green phosphor sub-layer, and a red phosphor sub-layer.

Figure 5:
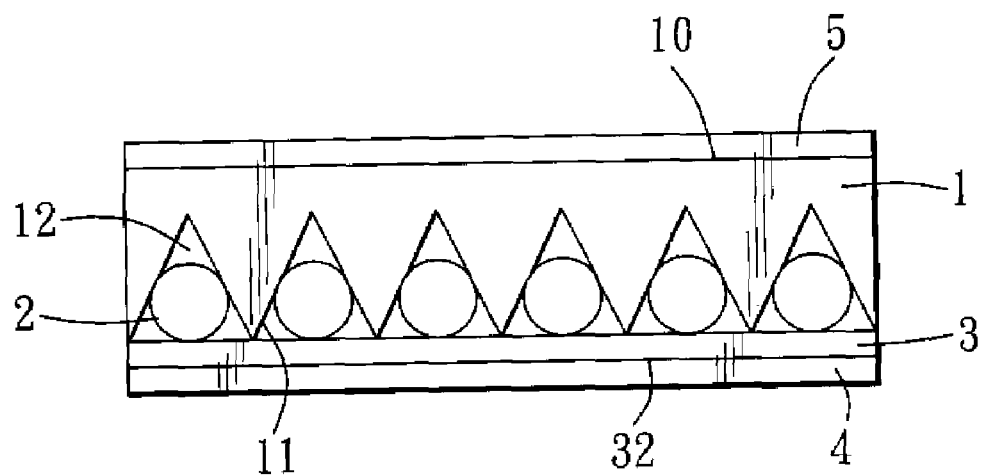
FIG. 5 is a schematic view of the second preferred embodiment of the backlight module according to this invention.

FIG. 5 illustrates the second preferred embodiment of the backlight module according to this invention. The second preferred embodiment differs from the previous embodiment in that the reflecting material 5 is formed on the planar surface 10 of the transparent panel 1, and that the fluorescent layer 4 is formed on the second surface 32 of the board 3.

Figure 6:
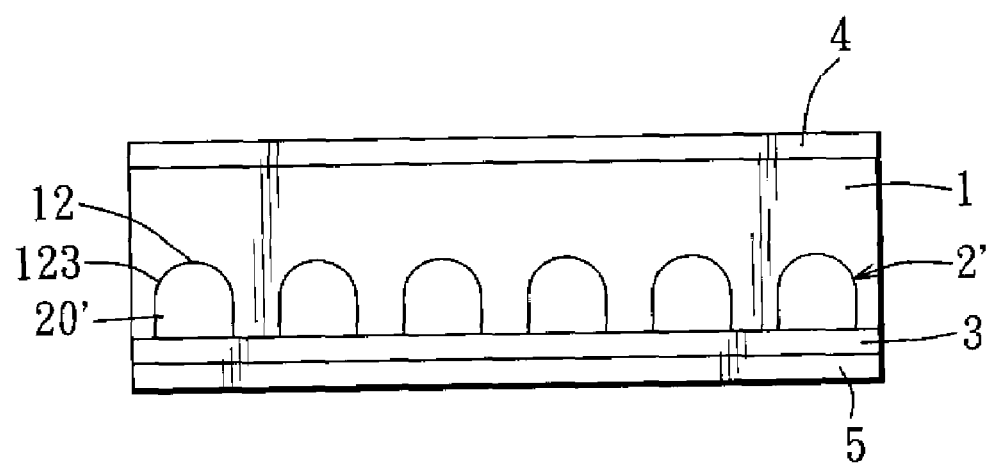
FIG. 6 is a schematic view of the third preferred embodiment of the backlight module according to this invention.

FIG. 6 illustrates the third preferred embodiment of the backlight module according to this invention. The third preferred embodiment differs from the previous embodiments in that each of the elongate grooves 12 is defined by a groove-defining wall 123 that cooperates with the board 3 to define an enclosed inner space 20' therebetween, and that each of the light emitting sources 2' includes a plasma forming gas received in the inner space 20' for radiating light when excited. As such, each of the light emitting sources 2' in this embodiment can be dispensed with a lamp tube commonly used in a conventional fluorescent lamp. Hence, the profile of the backlight module can be reduced.

With the formation of the elongate grooves 12 in the transparent panel 1 of the backlight module of this invention, the light emitting sources 2 can be received in the elongate grooves 12, respectively, thereby reducing the profile of the backlight module.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A backlight module comprising:
a transparent panel having a grooved surface and a planar surface opposite to said grooved surface, said transparent panel being formed with a plurality of elongate grooves that are indented from said grooved surface and that are aligned in a first lateral direction, each of said elongate grooves extending in a second lateral direction transverse to the first lateral direction, and having an open end;
a board having a first surface that is attached to said grooved surface of said transparent panel to cover said open ends of said elongate grooves, and a second surface opposite to said first surface;
a reflecting material provided on said planar surface of said transparent panel;
a fluorescent layer provided on said second surface of said board; and
a plurality of tubular light emitting sources disposed respectively in said elongate grooves for radiating light.

2. The backlight module of claim 1, wherein said board is transparent.

3. The backlight module of claim 2, wherein each of said light emitting sources is a fluorescent lamp.

4. The backlight module of claim 2, wherein each of said elongate grooves is defined by a groove-defining wall, said groove-defining wall cooperating with said board to define an enclosed inner space therebetween, each of said light emitting sources including a plasma forming gas received in said inner space for radiating light when excited.

5. The backlight module of claim 3, wherein said fluorescent lamp includes an inner tube defining an enclosed inner space and having an outer surface, a plasma forming gas received in said enclosed inner space, a phosphor coating formed on said outer surface of said inner tube, and an outer tube enclosing an assembly of said phosphor coating and said inner tube.

6. The backlight module of claim 1, wherein
said fluorescent layer includes a $TiO_2$ sub-layer, a PbS sub-layer, and a phosphor sub-layer.

7. The backlight module of claim 1, wherein said fluorescent layer includes a blue phosphor sub-layer, a green phosphor sub-layer, and a red phosphor sub-layer.

* * * * *